Nov. 25, 1969 R. W. MASSEY 3,480,197
CONTAINERS
Filed March 30, 1967
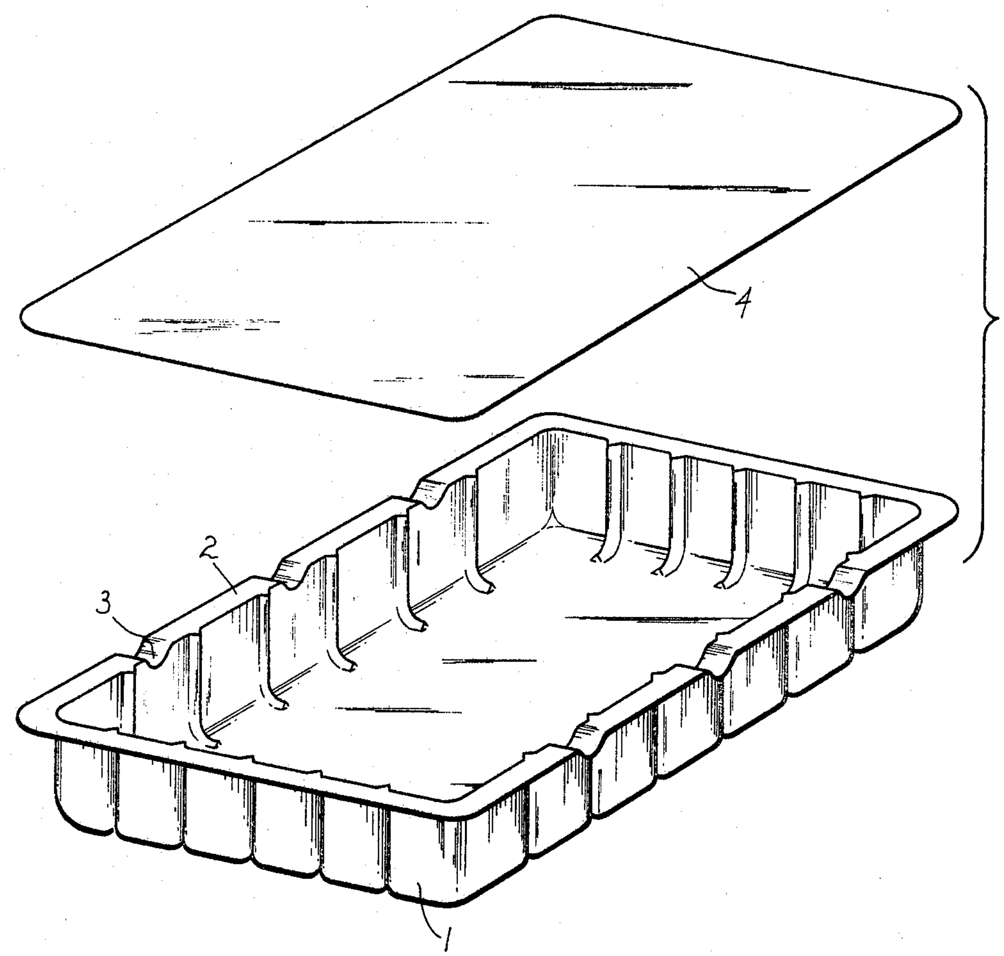
*INVENTOR.*
RONALD W. MASSEY
*BY* James C. Logomasini
*ATTORNEY*

United States Patent Office 3,480,197
Patented Nov. 25, 1969

3,480,197
CONTAINERS

Ronald W. Massey, Worthing, England, assignor to Monsanto Chemicals Limited, London, England, a British company Filed Mar. 30, 1967, Ser. No. 627,070
Claims priority, application Great Britain, Apr. 7, 1966, 15,670/66
Int. Cl. B65d *51/16, 81/00, 85/00*
U.S. Cl. 229—43 5 Claims

ABSTRACT OF THE DISCLOSURE

A covered packaging container having a series of venting channels permitting ingress or egress of gas which are formed simultaneously with the container and remain open after assembly.

This invention relates to containers and in particular to a new kind of packaging container that allows movement of gases to or from its interior.

Thermoplastic sheets, especially biaxially oriented resin sheets, are becoming increasingly used in such applications as packaging, where their properties have facilitated the introduction of mass production techniques. Aluminum foil has also been used in packaging. Packaging containers fabricated from thermoplastic sheets or aluminum foil are, however, in many cases impermeable to the atmosphere, and this makes them unsuitable for use with certain kinds of food and vegetables. Various designs of containers have been proposed in attempts to overcome this difficulty, but it has proved difficult to adapt such designs to the mass production of containers from thermoplastic sheets or aluminum foil. There has, however, now been developed a novel type of packaging container that has been formed from thermoplastic sheet material or from aluminum foil but which yet allows movement of gases to or from its interior.

It is a principal object of the present invention to provide such a packaging container which allows passage of gas into and out of its interior.

It is an additional object of the present invention to provide a packaging container made using thermoplastic sheet or aluminum foil which permits passage of gas into and out of its interior.

Other obejcts of this invention will in part be obvious and will in part appear hereinafter.

The invention comprises a packaging container formed from thermoplastic sheet material or aluminum foil, comprising a body portion, a lid, and sealing means for attaching the lid to the body comprising a peripheral flange on the body and a rim portion of the lid adjacent to its periphery, there being in the flange or the rim portion of the lid a shaped depression so as to form a venting channel permitting movement of gases to or from the interior of the complete container.

The invention also includes a body portion formed from thermoplastic sheet or aluminum foil, a peripheral flange on the body to which can be attached a flat lid so as to produce a packaging container according to the invention, there being in the flange a shaped depression so as to form a venting channel permitting movement of gases to or from the interior of the complete container.

Preferably there are several depressions spaced around the flange or lid so that there are a number of venting channels in the container.

The figure is a perspective view of a container and lid according to the present invention.

Referring to the figure, the container comprises a body portion 1 in the form a tray, pressure-formed from biaxially oriented polystyrene sheet, a peripheral flange 2 on the body, the flange being interrupted at intervals by relatively shallow depressions 3 of U-shaped cross-section. A flat lid 4 of biaxially oriented polystyrene sheet can be sealed around its rim to the flange in the areas between the depressions, the depressions forming venting channels that remain open after the heat-sealing operation and permit easy circulation of air or water vapor to and from the interior of the container.

Preferably the body portion is thermoformed from a thermoplastic sheet, for example by vacuum or pressure forming, the flange and the depression forming the venting channel being formed during this operation. The use of matching male and female dies presents another method of forming the body portion, particularly from aluminum foil.

Preferably the material from which the parts of the container are formed is a thermoplastic synthetic resin sheet, particularly a transparent sheet of biaxially oriented resin. A biaxially oriented polystyrene sheet is often particularly useful. Other suitable resins are polyolefins such as polyethylene or polypropylene; styrene copolymers, for instance styrene-acrylonitrile or acrylonitrile-butadiene-styrene copolymers; toughened polystyrene, that is to say a polystyrene that has been modified by the incorporation during or after polymerization, of a natural or synthetic rubber; polyacrylates; polymethacrylates; polycarbonates; polyvinyl chloride; and polyethylene terephthalate. Thermoplastic cellulose derivatives such as for example cellulose acetate or cellulose triacetate can be employed if desired.

The body portion and the lid need not be formed from the same material, for example two different thermoplastic sheet materials can be used for forming the body portion and the lid respectively, or these parts can be respectively formed from aluminum foil and a transparent biaxially oriented resin such as polystyrene.

Where the body portion is formed from a thermoplastic sheet, this is normally relatively thin, for instance having a thickness of between 0.002 and 0.04 inch, particularly between 0.005 inch and 0.02 inch. A sheet of thickness 0.01 inch is often convenient to use. The body portion and lid need not be of the same thickness; the lid can for instance have a thickness between 0.0005 and 0.020 inch, particularly between 0.001 and 0.005 inch, such as for example 0.003 inch. Where the container is formed from aluminum foil the body portion is preferably from 0.001 to 0.005 inch thick, for example from 0.002 to 0.003 inch thick and the lid is preferably from 0.0005 to 0.005 inch, for example from 0.001 to 0.003 inch thick.

Although in the container described above the depressions forming venting channels are of U-shaped cross-section, this is not essential and for example a V-shaped, square or rectangular cross-section can be employed if desired. A depression usually does not need to be more than about 0.5 inch wide, and preferably the width is between 0.1 inch and 0.3 inch, for example about 0.2 inch. The depth of a depression is preferably from 0.03 to 0.5 inch, but is usually between 0.08 and 0.2 inch, such as about 0.1 inch. It is very often convenient for the depth of a depression to be about half of its width.

The lid need not be flat, and for example where the contents of a container are intended to protrude above the flange of the body portion it is usually preferable to form the lid into a suitable shape so as to accommodate the protruding portion. The lid can then itself have a peripheral flange which would be considered part of the sealing means, which can be sealed to the flange of the body portion, and if desired there can be depressions in the lid flange similar to those in the flange of the body. In an alternative form of construction, there can be depressions in the lid flange only, the flange of the body portion being flat.

The body of the container may be closed in a variety of ways by the sealing means, which comprise a rim portion of the lid adjacent its periphery, and the body flange. Preferably a sealing method is used, for instance where the container is formed from a thermoplastic sheet, heat-sealing, impulse-sealing or ultrasonic sealing or sealing by the use of a solvent or an adhesive can be employed. Aluminum foil can also be heat-sealed, either to itself or to a thermoplastic sheet if the contact area is first coated with a suitable lacquer such as for instance a solution of polystyrene in benzene or methyl ethyl ketone. Any press that is used in a sealing operation needs to have its lower jaw cut away in areas that would otherwise contact the depressions. Preferably the upper jaw also is cut away in these areas. As an alternative to sealing, the lid or the flange can be shaped so that the lid can be mechanically clipped, for instance by staples, to the flange. A crimping method is often convenient where the body portion is formed from aluminum foil.

The containers of the invention are particularly suitable for the packaging of perishable foodstuffs such as meat, mushrooms, strawberries and other goods which are adversely affected by anaerobic bacteria. Furthermore, they permit the use of certain relatively impermeable thermoplastic materials, such as biaxially oriented polystyrene, which are characterized by high clarity and good surface appearance.

The venting channels can be used as a means through which preservative gases can be pumped into the container or through which air can be evacuated from the container, the channels being thereafter collapsed, for example by the application of heat, to give an air-tight seal.

It is obvious that many variations may be made in the products and processes set forth above without departing from the scope of this invention.

What is claimed is:

1. A packaging container formed from relatively thin thermoplastic sheet comprising a body portion having an opening and a lid, said body portion and said lid each having a sealing means portion which cooperate to partially seal said body when in assembled relationship, said sealing means portion having a permanently open depression formed therein which communicates at one end with the interior of the body and opens at its other end to the exterior of the container to form a channel for movement of gas into and out of said body.

2. The packaging container of claim 1 wherein the sealing means comprises a marginal portion of the lid and a flange extending outwardly from the upper end of the body, the depression forming the channel being in the flange of the body portion.

3. A packaging container according to claim 1, in which the thermoplastic synthetic resin sheet material is biaxially oriented polystyrene.

4. A packaging container according to claim 3 in which the body portion and lid are formed from thermoplastic sheet material, the material forming the body portion having a thickness between 0.005 inch and 0.02 inch, the material forming the lid having a thickness between 0.001 and 0.005 inch.

5. A packaging container according to claim 4 in which the depression has a width between 0.1 inch and 0.3 inch, and a depth between 0.08 inch and 0.2 inch.

References Cited

UNITED STATES PATENTS

| | | | |
|---|---|---|---|
| 2,113,683 | 4/1938 | De Witt. | |
| 2,633,284 | 3/1953 | Moffett et al. | 99—171 X |
| 2,674,536 | 4/1954 | Fisher | 99—171 X |
| 2,967,654 | 1/1961 | Palmer | 229—35 |
| 3,050,402 | 8/1962 | Dreyfus et al. | |
| 3,181,720 | 5/1965 | Cassie et al. | 215—56 |
| 3,251,529 | 5/1966 | Young | 229—8 |

DAVIS T. MOORHEAD, Primary Examiner

U.S. Cl. X.R.

99—171